US008442941B2

(12) United States Patent
Yao et al.

(10) Patent No.: US 8,442,941 B2
(45) Date of Patent: May 14, 2013

(54) SCALABLE DATABASE WORKLOAD REPLAY WITH MODE SELECTIONS

(75) Inventors: (Oliver) Gang Yao, Shanghai (CN); (Shirley) Qing Yue Wang, Shanghai (CN); (Elton) Zhi Yong Zheng, Beijing (CN); (Justin) Yi Cong Shen, Shanghai (CN)

(73) Assignee: Microsoft Corporation, Redmond, WA (US)

( * ) Notice: Subject to any disclaimer, the term of this patent is extended or adjusted under 35 U.S.C. 154(b) by 197 days.

(21) Appl. No.: 13/009,501

(22) Filed: Jan. 19, 2011

(65) Prior Publication Data

US 2012/0185430 A1   Jul. 19, 2012

(51) Int. Cl.
G06F 7/00 (2006.01)
G06F 17/00 (2006.01)

(52) U.S. Cl.
USPC .......................................................... 707/610

(58) Field of Classification Search .................. 707/611, 707/999.101, 610, 999.01
See application file for complete search history.

(56) References Cited

U.S. PATENT DOCUMENTS

| 6,775,826 | B1 * | 8/2004 | Zahavi et al. ................. 717/128 |
| 7,774,647 | B2 | 8/2010 | Vertes | |
| 2003/0163608 | A1 | 8/2003 | Tiwary et al. | |
| 2006/0074970 | A1 * | 4/2006 | Narayanan et al. ........... 707/102 |
| 2008/0098003 | A1 | 4/2008 | Dias et al. | |
| 2009/0271613 | A1 | 10/2009 | Brabson | |
| 2009/0320009 | A1 | 12/2009 | Chow et al. | |
| 2010/0005097 | A1 | 1/2010 | Liang et al. | |

FOREIGN PATENT DOCUMENTS

WO   2008051855 A1   5/2008

OTHER PUBLICATIONS

"Database Replay", Retrieved at << http://www.oracle.com/technetwork/database/features/manageability/db-replay-white-paper-ow07-1-2-133325.pdf >>, An Oracle White Paper, Nov. 2007, pp. 19.
"Using SQL Server Profiler", Retrieved at << http://msdn.microsoft.com/en-us/library/ms187929.aspx >>, Retrieved Date: Oct. 7, 2010, pp. 2.
"Real Application Testing", Retrieved at << http://wiki.oracle.com/page/Real+Application+Testing >>, Dec 1, 2007, pp. 2.
"Oracle-Base—Database Replay in Oracle Database 11g Release 1", Retrieved at << http://www.oracle-base.com/articles/11g/DatabaseReplay_11gR1.php >>, Retrieved Date: Nov. 23, 2010, pp. 18.
"SQL Server Upgrade Assistant—Insufficent data from Andrew Fryer", Retrieved at << http://blogs.technet.com/b/andrew/archive/2008/03/29/sgl-server-upgrade-assistant.aspx >>, Mar. 29, 2008, pp. 2.

* cited by examiner

*Primary Examiner* — Alexey Shmatov
(74) *Attorney, Agent, or Firm* — Ogilvie Law Firm

(57) ABSTRACT

To help a database administrator assess the impact of database server changes on applications, trace files are preprocessed into intermediate files with events sorted by generation order. Unused event classes and columns of a trace file are excluded, and pre-calculated data may be included. Intermediate files are then dispatched across a set of clients, and replay occurs in a synchronization mode or a stress mode. Synchronization mode releases events in submission order, whereas stress mode releases events in emulation of their original timing. Replay parameters include server idle time cap, query timeout value, a connect-time scaling factor for scaling time between trace start and connection login, and a think-time scaling factor for scaling the time between events on a replay client—database server connection. Each replay client generates a result file, which a replay controller aggregates for administrator analysis.

20 Claims, 5 Drawing Sheets

US 8,442,941 B2

SCALABLE DATABASE WORKLOAD REPLAY WITH MODE SELECTIONS

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

It is understood that the workload placed on a database server can vary over time, depending on the database applications it serves and on the demands made of those applications by end users. However, users also expect applications (and hence the supporting database servers) to provide adequate results in terms of response speed, availability, and the like. Sometimes changes to a database server are considered, in order to update a version or install new features, for example. When considering server configuration changes, database administrators may seek tools and techniques which will help them assess the potential impact of the server changes on the database applications and hence on the end users' experience. In particular, database administrators sometimes capture a trace of database requests made to a current production server in order to replay those requests to an upgraded or otherwise modified server, to see how well the modified server handles that set of requests.

SUMMARY

Database Administrators (DBAs) sometimes wish to assess application compatibility before performing server maintenance or an upgrade to the latest server release. To facilitate runtime checks, some embodiments described herein provide a scalable replay tool to simulate mission-critical workloads.

For example, some embodiments help a database administrator assess the potential impact of database server changes on database application behavior. Captured database activity trace files are preprocessed into intermediate files in which database events are sorted according to their order of generation. The intermediate files are dispatched across a set of replay clients; the files are shredded, not replicated. The DBA sets up the replay by specifying service accounts, configuring filesystem permissions, provisioning component access, and creating firewall rules. Then the DBA selects a replay mode, which can be a synchronization mode or a stress mode. The synchronization mode will release events during replay in a manner that maintains the submission order across connections and using the original timestamp in which events were submitted to a database server, whereas the stress mode will release events during replay in emulation of the event-to-event timing in which events were submitted to the database server without maintaining cross-connection submission order. Variations of each mode are discussed herein, and unless indicated otherwise, any reference to a particular mode herein encompasses all variations of that mode. The DBA then initiates a database activity replay for a chosen database server configuration using the intermediate files, the replay clients, and the selected replay mode. A second replay can be initiated for a second database server configuration, and the results can be compared to help assess the impact of server configuration changes.

In addition to replay mode, some embodiments recognize other replay parameters, such as a cap on server idle time, a query timeout value, a connect-time scaling factor for scaling the time between a trace start and a connection login, and a think-time scaling factor, for scaling the time between events on a replay client—database server connection.

Viewed from a replay client point of view, some embodiments for simulating database application behavior involve obtaining a portion of intermediate file(s) in which database events are sorted according to their order of generation, receiving a replay mode instruction which specifies a synchronization mode or a stress mode, and releasing request events to a database server during a replay in response to the specified mode. If the synchronization mode is specified then the replay client releases request events to the server in an event sequence order stated in the intermediate file(s) and maintains the submission order across connections, and if the stress mode is specified then the replay client releases request events to the server in an attempted emulation of a timing stated in the intermediate file(s) without maintaining cross-connection submission order. When synchronization mode is specified, replay clients synchronize with each other to provide cross-connection event order synchronization during the replay. In some embodiments, replay in synchronization mode attempts to release events according to their original submission time as long as cross-connection event order is maintained. In some embodiments, replay in stress mode only maintains the think time between events and the event order within a single connection. Each replay client generates a respective result file, and a replay controller may aggregate the replay client result files for analysis by the DBA.

Viewed from an architectural perspective, some distributed database activity replay embodiments include a replay controller and at least two replay clients. The replay controller and each replay client have a respective logical processor and a respective memory in operable communication with the logical processor through buses, timing signals, and the like, for example. The replay controller is in operable communication with the replay clients through network connections, for example. A replay mode instruction, residing in at least the replay controller memory, is selected from and specifies at least one of: a synchronization mode in which event replay is synchronized across the replay clients, a stress mode in which event replay is not synchronized across the replay clients. Client replay code modules reside in the respective replay client memories. Each replay module is configured with data and instructions that cause the replay client to release request events to a SQL database server or other database server during a replay as indicated by the specified mode.

In some embodiments, a replay administration tool operated by a DBA is in operable communication with the replay controller to identify a replay events file to the replay controller. The administration tool may run on the same machine that runs the replay controller, and communicate with the controller via shared memory, interprocess messages or the like, or the administration tool may run on separate machine and communicate with the replay controller via a network. The replay events file may be a familiar captured database activity trace file to be preprocessed by the controller before the replay, or it may be an intermediate file previously produced from a trace file by a preprocessing module. In the intermediate file, database events of a trace file are sorted according to their order of generation; any unused event classes and any unused event columns of a trace file can also be excluded from the intermediate file. Pre-calculated data may be included in the intermediate file to reduce processing during a replay.

In some embodiments, synchronization mode means that the client replay modules are configured to release request events while satisfying (a) an order synchronization constraint under which event submission order is maintained both within and across connections between a database server and the replay clients, and (b) a time synchronization constraint under which the replay clients attempt to emulate request event submission time. Stress mode satisfies neither of the foregoing conditions. In some embodiments, when stress mode is used the client replay modules allow scaling of a connect-time between a trace start and a connection login, and also allow scaling of a plurality of think-times between events on a connection.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
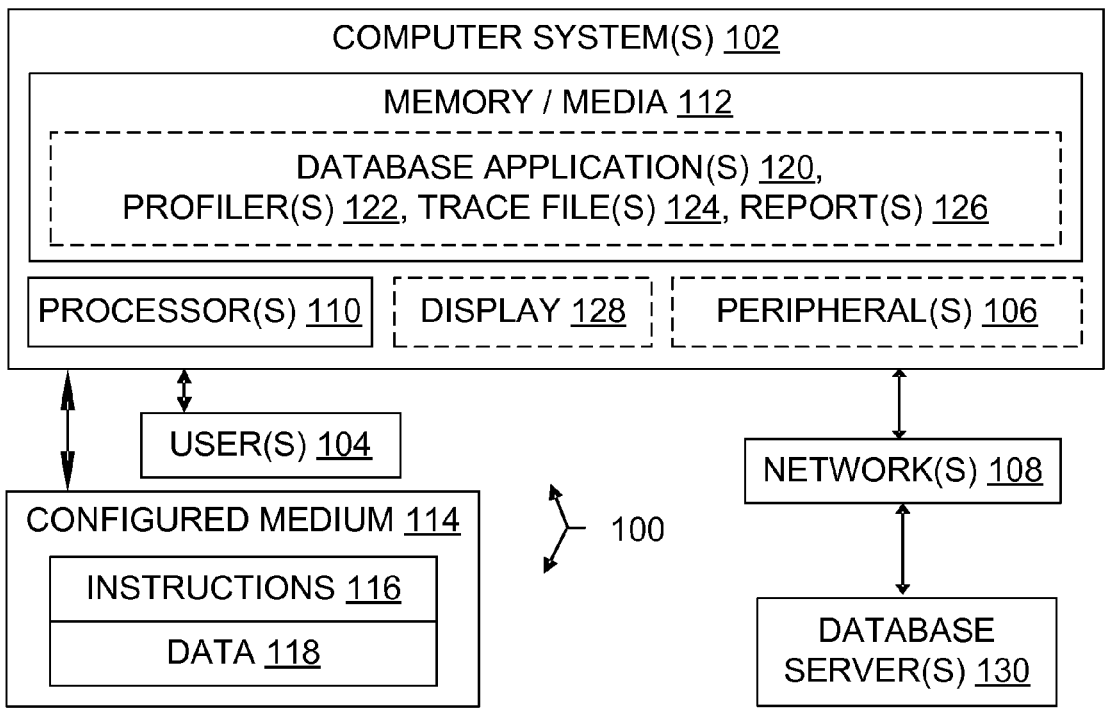
FIG. 1 is a block diagram illustrating a computer system having at least one processor, at least one memory, at least one database application, a connection to a database server, and other items in an operating environment which may be present on multiple network nodes, and also illustrating configured storage medium embodiments.

Database Administrators (DBAs) may be responsible for assessing application compatibility prior to performing an upgrade to the latest Microsoft® SQL Server® product release, Service Pack, or Community Technology Preview (CTP) (Microsoft and SQL Server are registered marks of Microsoft Corporation), or performing similar operations on another database server. The first step DBAs often take is to run a tool such as Microsoft® UA (Upgrade Advisor) to perform static checks against database schema, objects, SQL traces, and T-SQL scripts, for example. Often the next step desired is to perform more thorough runtime checks and to make performance/scalability comparisons.

However, it is often difficult to do runtime checks, due to the lack of an adequate scalable replay tool that can simulate mission-critical workload in an authentic manner. Some familiar database profilers provide some replay functionality. However, they may lack scalability and other features, making them difficult or impractical for use in simulating heavy workloads.

Some embodiments described herein provide tools and techniques to assist database workload replay. Some embodiments use multiple load-balanced client machines during the replay, to help achieve scalability while simulating a heavy workload. Some provide different replay modes (stress and sync) and tuning options to more realistically simulate an application's behavior. Some use trace file preprocessing to reduce the replay-time overhead and allow more authentic workload replay.

Some embodiments described herein may be viewed in a broader context. For instance, concepts such as distributed processing, synchronization, event ordering, scaling, and database activity may be relevant to a particular embodiment. However, it does not follow from the availability of a broad context that exclusive rights are being sought herein for abstract ideas; they are not. Rather, the present disclosure is focused on providing appropriately specific embodiments. Other media, systems, and processes involving distributed processing, synchronization, event ordering, scaling, and database activity are outside the present scope. Accordingly, vagueness and accompanying proof problems are also avoided under a proper understanding of the present disclosure.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyper-threaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, module codes, and other code written by programmers (who are also referred to as developers).

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine. However, "automatically" does not necessarily mean "immediately".

Throughout this document, use of the optional plural "(s)" means that one or more of the indicated feature is present. For example, "file(s)" means "one or more files" or equivalently "at least one file".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as "launching", "dispatching", "initiating", "provisioning", "accessing", "viewing", "deriving", "displaying", "collecting", "transmitting", "sending", "issuing", or "communicating" with regard to a destination or other subject may involve intervening action such as messaging, forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory thereby transforming it to a particular article, as opposed to simply existing on paper, in a person's mind, or as a transitory signal on a wire, for example.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106. Database administrators and other system administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, and/or other types of storage media (as opposed to merely a signal, that is, storage media 112 are not propagated signal media). In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116.

The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by replay as discussed herein, e.g., by preprocessing, ordering, selective inclusion, shredding, dispatching, scaling, aggregating, binding, deployment, execution, modification, display, creation, loading, and/or other operations.

A database application 120, database profiler 122, database activity trace files 124, database performance and other reports 126, other documents and software, and other items shown in the Figures and/or discussed in the text may reside partially or entirely within one or more media 112, thereby configuring those media. Database server(s) 130 are generally part of an environment 100; servers 130 are computer systems which have their own processor(s) and memory. In addition to a processor(s) 110 and memory 112, an operating environment may also include other hardware, such as display(s) 128, buses, power supplies, and accelerators, for instance.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
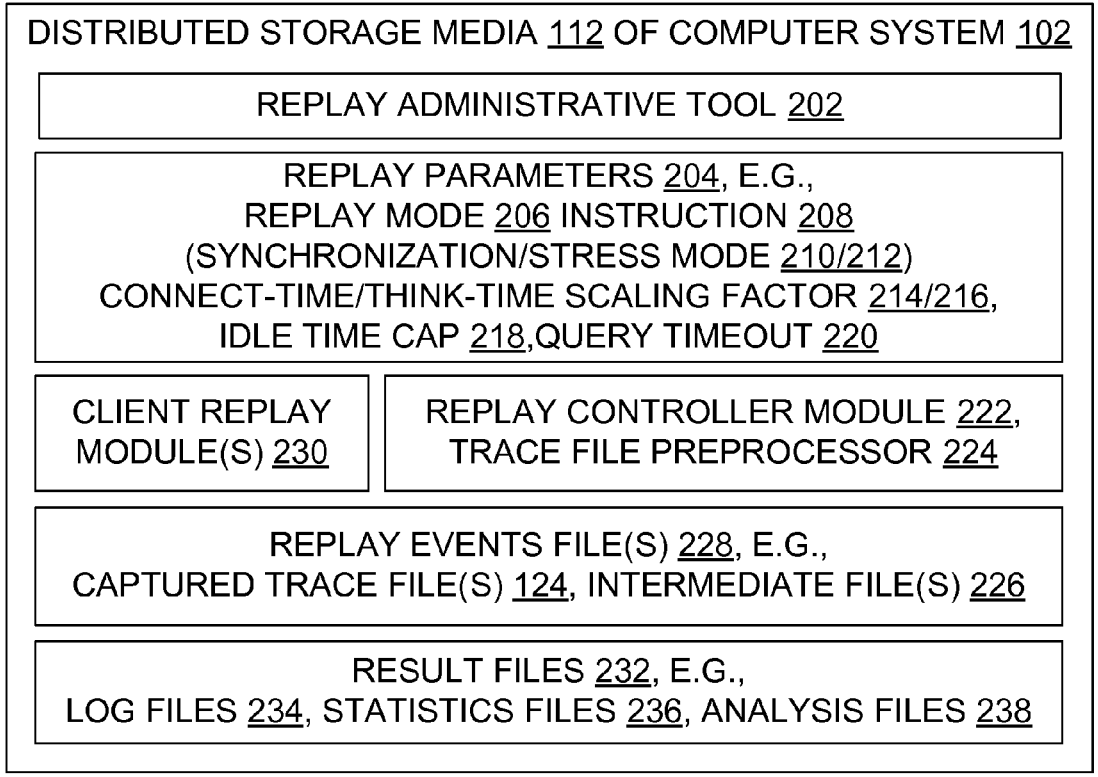
FIG. 2 is a block diagram illustrating an example architecture for distributed scalable database workload replay with mode selections and preprocessed intermediate files.

FIG. 2 illustrates an architecture which is suitable for use with some embodiments. A replay administrative tool 202 provides a convenient interface for DBAs to designate trace files 124 for replay, and to set various replay parameters 204. A replay mode 206 instruction 208, for example, indicates whether a replay of database request events should adhere primarily to event order (synchronization mode 210) or to event timing (stress mode 212). Connect-time and think-time scaling factors 214, 216, respectively, indicate whether certain original durations (illustrated in FIG. 5) should be maintained in the replay or should instead be stretched or shrunk by some factor. An idle time cap 218 parameter indicates whether server idle time should be limited to be less than a specified cap value, and a query timeout 220 parameter sets a period in which a server response must be received to prevent a retry of the underlying request.

In some embodiments, a replay controller module 222 includes or cooperates with a trace file preprocessor 224, which processes trace files 124 into intermediate files 226. Trace files and intermediate files are examples of replay event files 228. Input captured database trace files 124 can be in the format of native trace files, XML files, or database tables, for example. Likewise, intermediate trace and result trace files may use any suitable format which supports the functionality described herein. Intermediate files 226 are dispatched to client replay modules 230, which make database requests to a server 130 based on the intermediate file content and the specified replay parameters 204. The request results and other replay data are reflected in result files 232 such as log files 234, statistics files 236, and performance analysis files 238.

Figure 4:
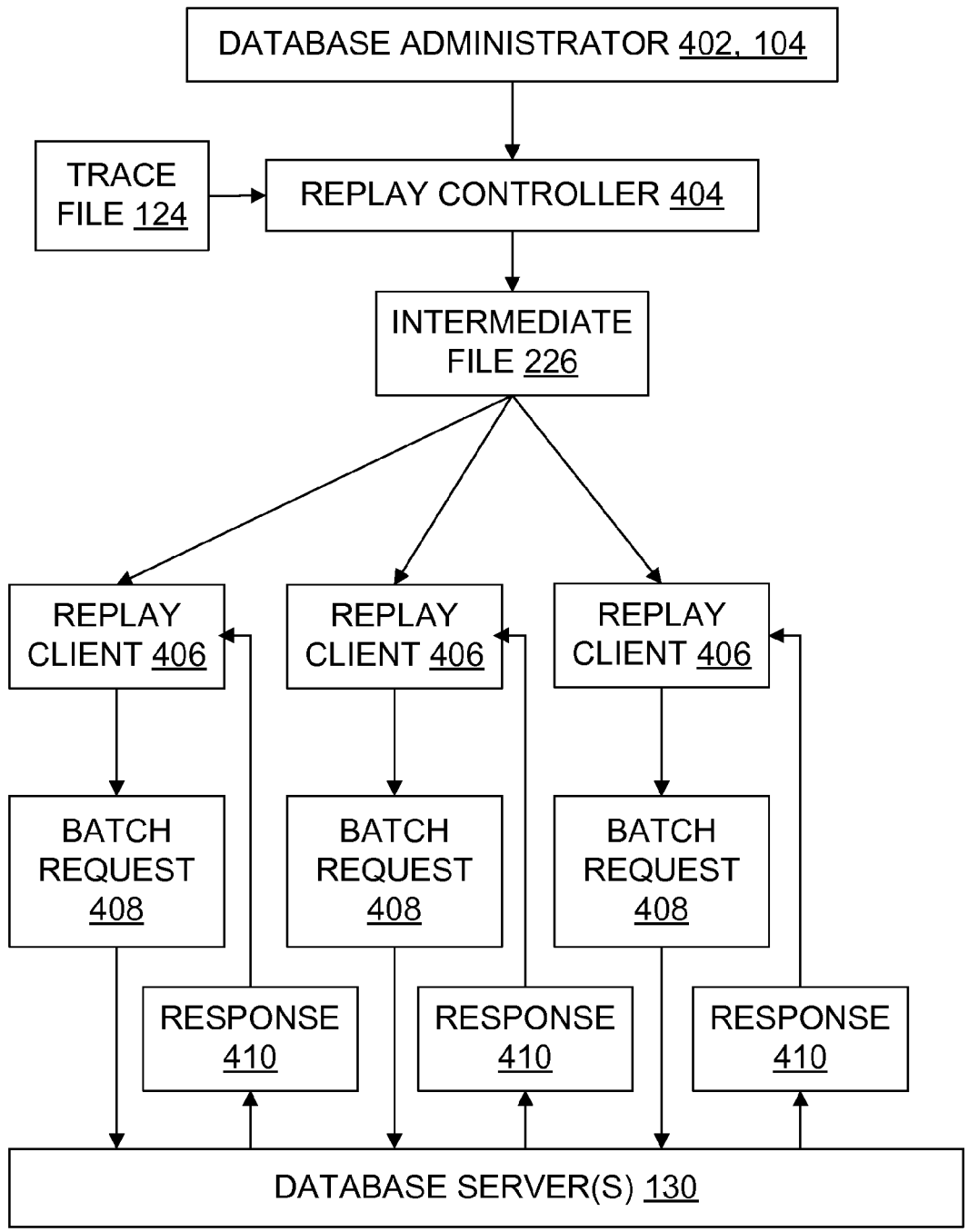
FIG. 4 is a data flow diagram illustrating some embodiments.

FIG. 4 further illustrates aspects of an architecture which is suitable for use with some embodiments. A database administrator 402 (an example of a user 104) provides input to a replay controller 404, either directly or through a replay administrative tool 202. In addition to a replay mode 206 and other parameters 204, the DBA 402 provides the controller 404 with the location or other specification of one or more trace files 124. The controller 404 (or a preprocessor 224 invoked by the controller) processes the trace file(s) to produce one or more intermediate files 226, and dispatches the intermediate file(s) 226 to multiple replay clients 406; three clients 406 are shown but more or fewer may be used in a given embodiment. The replay clients 406 send batch requests 408 to the database server(s) 130, based on the parameter(s) 204 and the intermediate file(s) 226, and from the responses 410 generate corresponding result file(s) 232, which can be analyzed by the DBA.

With reference to FIGS. 1, 2, and 4, some embodiments provide a computer system 102 with a logical processor 110 and a memory medium 112 configured by circuitry, firmware, and/or software to transform trace files for distributed and parameterized replay as described herein.

For example, some embodiments of a distributed database activity replay computer system include a replay controller 404 and at least two replay clients 406. The replay controller 404 and each replay client 406 have a respective logical processor 110 and a respective memory 112 in operable communication with the respective logical processor. The replay controller 404 is in operable communication with the replay clients 406 via a network 108. A replay mode instruction 208 residing in at least the replay controller memory is selected from and specifies at least one of: a synchronization mode 210 in which event replay is synchronized across the replay clients 406, and a stress mode 212 in which event replay is not synchronized across the replay clients. Client replay modules 230 reside in the respective replay client memories, and each replay module is configured with data and with instructions that when executed by at least one processor 110 causes the processor(s) to perform a process in which the replay client 406 releases request 408 events to a database server 130 during a replay as indicated by the specified mode 206.

In some embodiments, the server 130 includes a SQL database server which is in operable communication with the replay clients 406 to receive request events and to send corresponding responses to the replay clients.

Some embodiments include a replay administration tool 202 which is in operable communication with the replay controller 404 to identify a replay events file 228 to the replay controller. If the identified file is an intermediate file 226, then that file 226 is dispatched to the replay clients 406, and if the identified file is a trace file 124 then that file 124 is preprocessed and the resulting intermediate file 226 is dispatched to the replay clients 406.

Some embodiments include a preprocessing module 224 configured with data and with instructions that when executed by at least one processor causes the processor(s) to perform a process in which database events of a captured database activity trace file 124 are sorted according to their order of generation. In some, the preprocessing module 224 performs a process in which any unused event classes and any unused event columns of a trace file 124 are excluded from inclusion in the intermediate file 226. In some embodiments, the preprocessing module 224 places pre-calculated data (using familiar approaches) in the intermediate file 226 to reduce processing during a replay.

In some embodiments, when the replay mode instruction 208 specifies the synchronization mode 210, the client replay modules 230 are configured to release request events while satisfying two constraints. First, an order synchronization constraint maintains event submission order both within and across connections between a database server 130 and the several replay clients 406. Second, a time synchronization constraint attempts to emulate request event submission times used by the replay clients; perfect compliance with the submission times is not required, but times are complied with when it is possible to do so in realistic view of the system resources available and the demands made on those resources.

Figure 5:
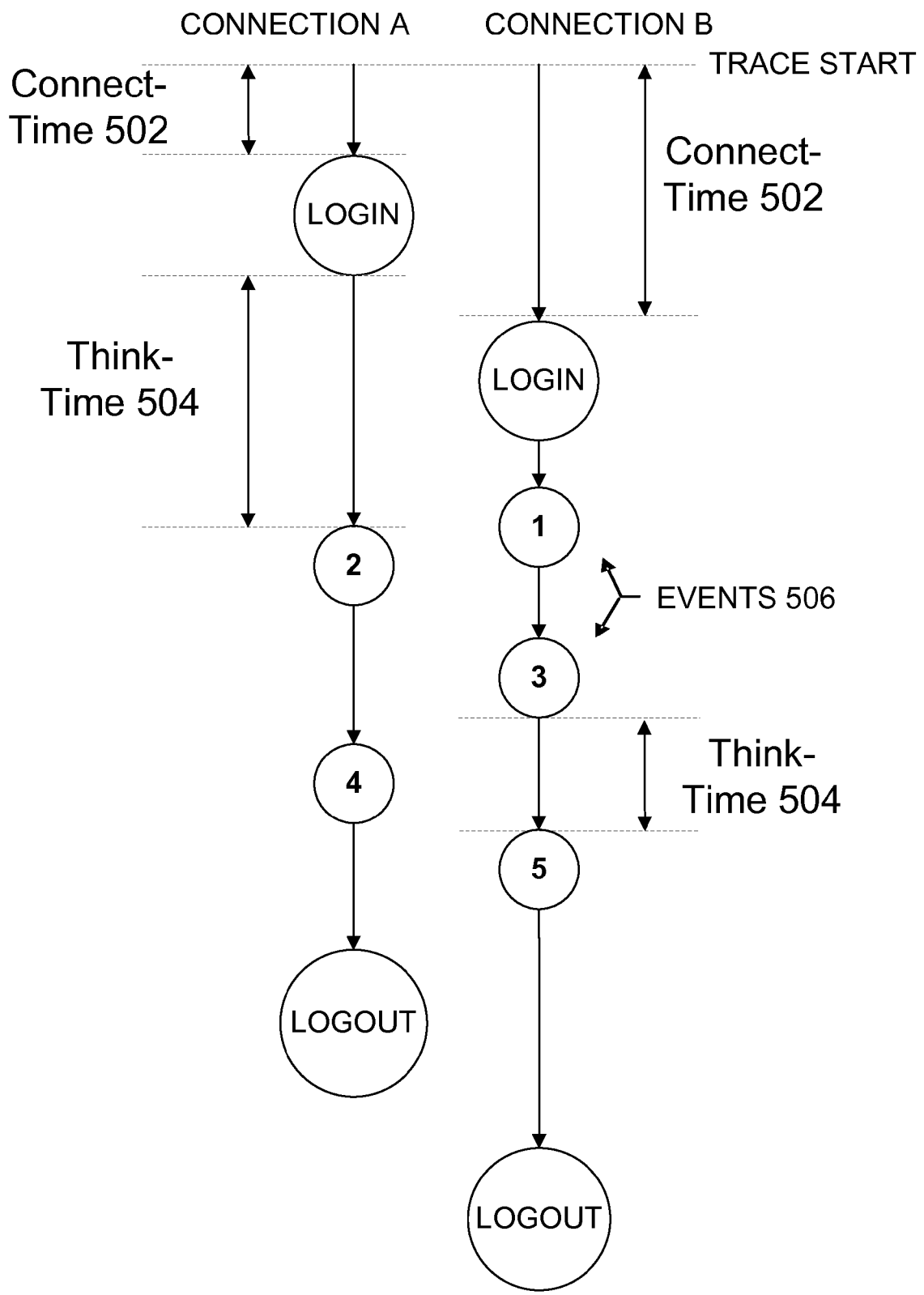
FIG. 5 is a diagram illustrating connect-time and think-time values which are subject to scaling in some embodiments.

In some embodiments, when the replay mode instruction 208 specifies the stress mode 212, the client replay modules 230 are configured to allow scaling of a connect-time between a trace start and a connection login, and the client replay modules are also configured to allow scaling of a plurality of think-times between events on a connection. Examples of connect-time 502 and think-time 504 in relation to login and request events 506 are illustrated in FIG. 5.

Some embodiments include a first replay result file 232 from (a) a first replay performed with a replay controller 404, replay clients 406, an intermediate file 226, and a first SQL or other database server 130, and (b) a second replay result file 232 from a second replay performed with the replay controller 404, the replay clients 406, the intermediate file 226, and a second SQL or other database server 130. By comparing the results of the two replays, a DBA 402 may gain insight into the advantages and disadvantages of each server 130 with regard to the application 120 activity reflected in the intermediate file 226.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, replay clients 406 may be on multiple devices/systems 102 in a networked cloud, result files 232 may be stored on yet other devices within the cloud, and the replay controller 404 may configure the display 128 on yet another cloud device/system 102.

Processes

Figure 3:
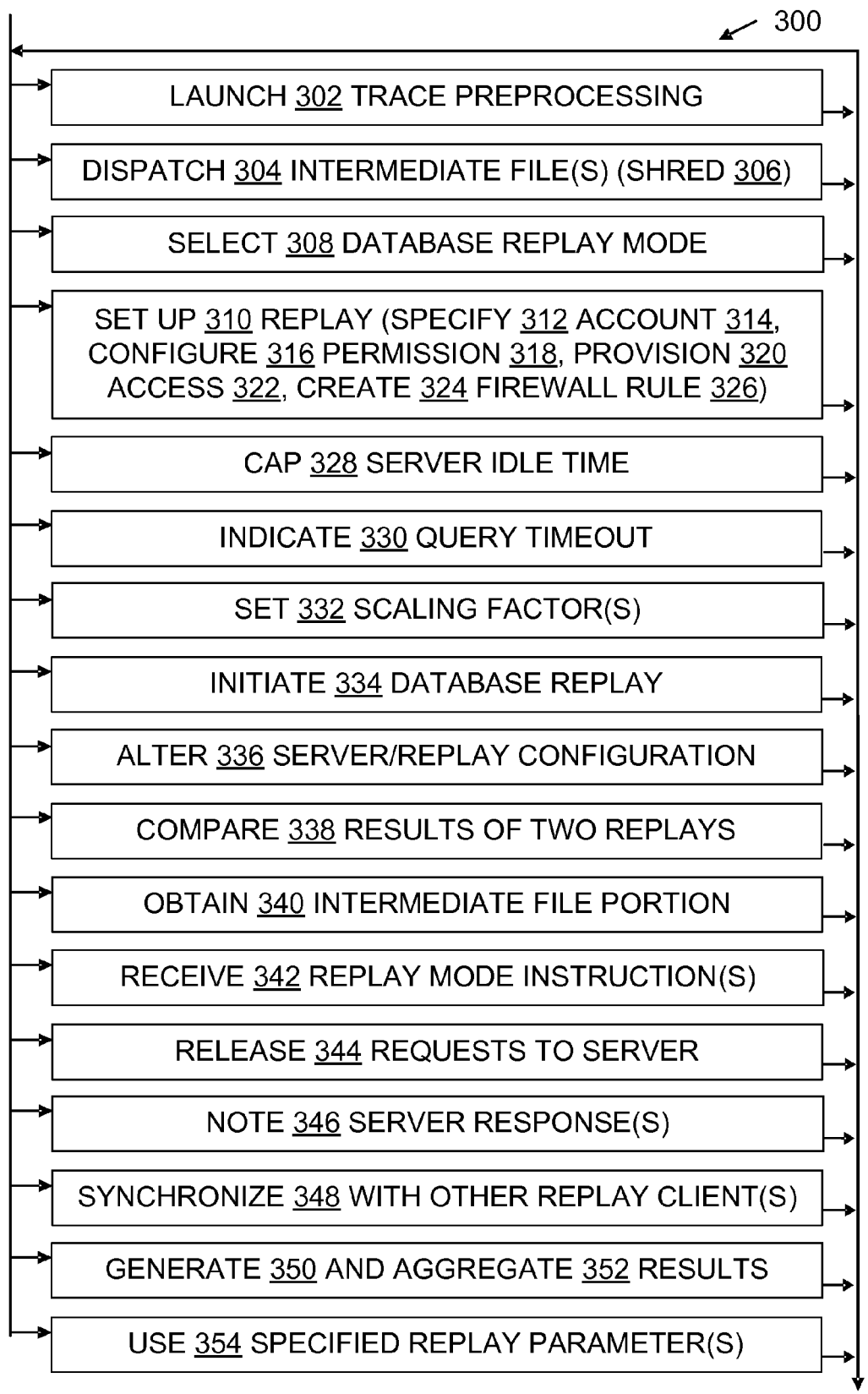
FIG. 3 is a flow chart illustrating steps of some process and configured storage medium embodiments.

FIG. 3 illustrates some process embodiments in a flowchart 300. Processes shown in the Figures may be performed in some embodiments automatically, e.g., at the behest of a replay controller 404 under control of a script requiring little or no contemporaneous user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During a trace preprocessing step 302, a user (or an embodiment acting on behalf of a user) launches preprocessing of one or more trace files 124 in order to produce one or more intermediate files 226. For convenience, the launching of preprocessing may also be referred to simply as preprocessing. Preprocessing 302 may sort database events of a captured database activity trace file according to their order of generation, may exclude any unused event classes and any unused event columns of a captured database activity trace file, and/or may merge multiple traced events into a single replay command in the intermediate file, for example. Step 302 may be accomplished using a trace file preprocessor 224 or other mechanism to place events 506 in order, to exclude data unrelated to the events, and/or to include pre-calculated data, for example.

During a dispatching step 304, one or more intermediate files 226 are made available to one or more replay clients 406. Presumptively, a dispatched intermediate file is shredded 306, which means it is divided into pieces and the pieces are sent to the clients, such that no client receives the entire file 226. Shredding may be accomplished by partitioning the file 226 into non-overlapping portions, or by allowing some overlap in case one of the clients is overloaded or goes down so that another client is ready to immediately step in and fill that client's role in releasing requests 408. File 226 portions may be equal, or may be weighted according to the clients' processing power, the bandwidth of clients' connections to the server 130, and/or other factors. Dispatching may use replication instead of shredding, contrary to the presumption in favor of shredding, if replication is expressly recited as being used, in which case each client gets the entire file 226. Dispatching may be accomplished using networks and software mechanisms, for example.

During a replay mode selecting step 308, a user (or an embodiment acting on behalf of a user) selects a replay mode 206 from among options which may include, for example, a synchronization mode 210, a stress mode 212, and other modes. Selection may be accomplished using a command line interface, graphical user interface, default setting, setting embedded in code, and/or other mechanism, in a replay administrative tool 202, replay controller 404, and/or replay client 406, for example.

During a replay setting up step 310, a user (or an embodiment acting on behalf of a user) sets up an environment 100 as a suitable context for a replay. Set up 310 may include, for example, specifying 312 a controller service account 314 on a replay controller 404, specifying 312 a client service account 314 on each replay client 406, configuring 316 folder and file permissions 318 for the controller and client service accounts 314, provisioning 320 DOOM and/or other component access 322 on the controller 404, creating 324 firewall rules 326 on the clients and controllers to permit operable communication between them, specifying client 406 configuration settings (controller 404 name, working directory, and result directory), and granting each client service account permissions 318 on the server 130.

During a server idle time capping step 328, a user (or an embodiment acting on behalf of a user) sets a cap 218 (maximum) on the server 130 idle time. In some embodiments, the cap is implemented by replay clients 406. During stress mode replay, for example, the release of requests to the server 130 may be faster than the timing specified in the original trace file if adhering to the original timing would exceed the cap 218.

During a query timeout indicating step 330, a user (or an embodiment acting on behalf of a user) sets a maximum waiting period for a response 410 from the server 130, namely, a query timeout 220 value. In some embodiments, the query timeout 220 is implemented by replay clients 406. During replay, for example, a failure by the server 130 to meet the replay's timeout 220 may cause one or more retries which repeat a given request 408 even if no retry was specified in the original trace file.

During a scaling factor(s) setting step 332, a user (or an embodiment acting on behalf of a user) sets a connect-time scaling factor 214 and/or sets a think-time scaling factor 216 for use by the replay client(s) 406. In some embodiments, one or both of these factors can be used in replay clients 406, to increase and/or decrease the connect-time 502 and/or the think-time 504, respectively.

During a replay initiating step 334, a user (or an embodiment acting on behalf of a user) initiates a replay, e.g., by having a replay controller 404 instruct replay clients 406 to start releasing requests 408 based on a previously dispatched 304 intermediate file 226.

During a server/replay configuration altering step 336, a user (or an embodiment acting on behalf of a user) manually or automatically alters a replay configuration and/or a server configuration. For example, a replay configuration may be altered 336 by changing replay parameter(s) 204, by changing the number of replay client(s) 406 used, and/or by changing client replay module(s) 230. A server configuration may be altered 336 by changing server 130 code, server 130 hardware, and/or the number of server processor(s) which are operating together as a clustered or other virtual database server 130.

During a replay comparing step 338, a user (or an embodiment acting on behalf of a user) manually or automatically compares result file(s) 232 from two replays which have different respective configurations, e.g., a first replay with a first configuration and a second replay having a second configuration obtained by altering 336 the first configuration. Any of the familiar result characteristics considered by profilers 122 and/or otherwise familiar to DBAs may be compared 338.

During an intermediate file portion obtaining step 340, a replay client 406 obtains at least a portion of an intermediate file 226. Unless expressly stated otherwise, the portion obtained is understood to be a proper subset (less than the entire) of the intermediate file 226. Step 340 may be viewed as corresponding to dispatching step 304, except that dispatching step 304 is from a controller/DBA perspective while intermediate file portion obtaining step 340 is from a replay client 406 perspective.

During an instruction receiving step 342, a replay client 406 receives a replay mode instruction 208 and may also receive additional replay parameter(s) 204, e.g., embedded within an intermediate file 226 and/or as a command received over a network 108 from a replay controller 404.

During a request releasing step 344, a replay client 406 releases requests, such as batch requests 408, to a database server 130 as specified by a replay mode instruction 208 and any additional replay parameter(s) 204.

During a response noting step 346, a replay client 406 notes responses 410 from a database server 130 to released 344 requests, or lack thereof, in one or more result files 232.

During a synchronizing step 348, a replay client 406 operating in synchronization mode 210 synchronizes with other replay client(s) directly or through a replay controller 404, to maintain the order of events, and in particular to release 344 requests to a database server 130 in an order indicated in an intermediate file 226.

During a result generating step 350, which may include response noting step 346, a replay client 406 generates result file(s) 232. In addition to noting responses 410 from a database server 130 to released 344 requests, result generating step 350 may include replay-specific data such as statistics on synchronization 348 with other clients, replay parameter(s) 204 used in the replay, and replay configuration set up 310 information.

During a result aggregating step 352, a replay controller 404 gathers and consolidates result files 232 from multiple replay clients 406.

During a parameter using step 354, a replay controller 404 and/or replay client(s) 406 use replay parameter(s) 204 during a replay while requests are being released 344.

During a memory configuring step, which may be part of one or more of the preceding steps, a memory medium 112 is configured by a replay administrative tool 202, replay parameter(s) 204, replay controller module 222, client replay module(s) 230, intermediate file 226, or otherwise in connection with a distributed scalable database workload replay with mode selections as discussed herein.

Figure 6:
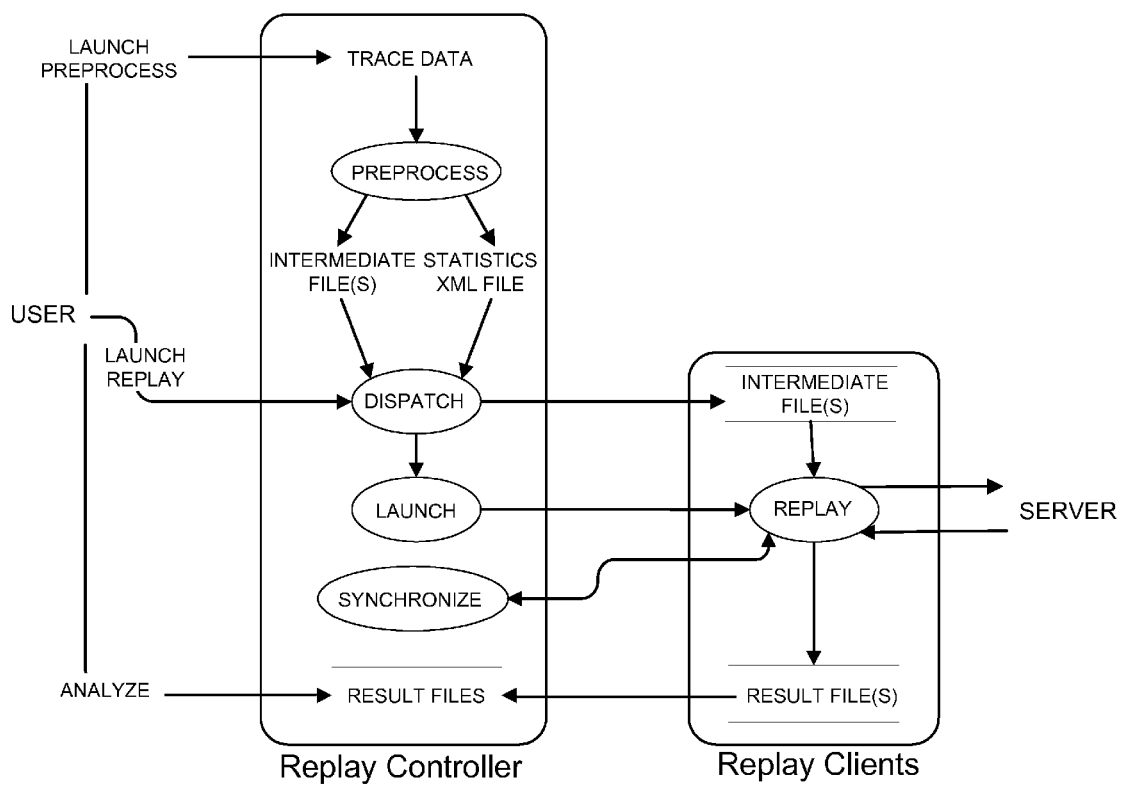
FIG. 6 is another data flow diagram illustrating some embodiments.

FIG. 6 further illustrates data flow and process steps in some embodiments. A DBA or other user launches preprocessing, which converts trace file data into intermediate file(s). Statistics files in XML or other form may also be produced by the preprocessor, with information such as the elapsed time, number of events, peak event frequency, and so on, regarding the events in the trace file, the intermediate file, or both. After the user launches a replay, the intermediate file(s) are dispatched to the replay clients, and used by the clients to send requests to the database server. Server responses are noted, and result files are generated by the clients, to be subsequently aggregated manually or automatically by the controller. Clients may synchronize with one another, directly or through the controller. The DBA can analyze the results, and compare results from replays having different configurations, to help assess the impact of contemplated or production server changes.

The foregoing steps and their interrelationships are discussed in greater detail below, in connection with various embodiments.

Some embodiments provide a process suitable for use by a database administrator to help assess the potential impact of database server changes on database application behavior. The process includes launching 302 a database activity trace preprocessing phase which converts captured database activity trace file(s) 124 into intermediate file(s) 226 in which database events are sorted according to their order of generation. The process also includes dispatching 304 the intermediate file(s) across a set of replay client(s) 406, and selecting 308 between at least a synchronization mode 210 and a stress mode 212. The synchronization mode is configured to release 344 events during replay in the order in which events were submitted to a database server 130, while the stress mode is configured to release 344 events during replay in emulation of the timing in which events were submitted to the database server, in the original trace file. The process also includes initiating 334 a database activity replay using the intermediate file(s), the replay client(s), and the selected mode.

In some embodiments, the initiating step initiates 334 a first server database activity replay using the intermediate file(s), the replay client(s), the selected mode, and a first database server configuration, and the process further includes initiating 334 a second database activity replay using the intermediate file(s), the replay client(s), the selected mode, and a second (i.e., altered 336) database server configuration. Some of these embodiments involve comparing 338 a result of the first server database activity replay with a result of the second server database activity replay.

Some embodiments include capping 328 server idle time for the replay. Some include indicating 330 a query timeout value for the replay. Some include setting up 310 the replay; in others, the set up is done separately, e.g., by someone other than the DBA. Some include setting 332 a connect-time scaling factor 214 for scaling the time between a trace start and a connection login during a replay, and some include setting 332 a think-time scaling factor 216, for scaling the time between events on a replay client—database server connection during a replay.

As noted, the number of replay clients may vary. For example, in some embodiments, the dispatching step dispatches 304 the intermediate file(s) 226 by shredding 306 the intermediate file(s) across a set of at least three replay clients.

Some embodiments provide a process for simulating database application behavior, including a replay client 406 obtaining 340 a portion (less than all) of intermediate file(s) 226 in which database events are sorted according to their order of generation; the replay client receiving 342 a replay mode instruction 208 which specifies a synchronization mode or a stress mode; and the replay client releasing 344 request events to a database server during a replay in response to the specified mode. That is, if the synchronization mode is specified then the replay clients collectively release request events to a database server in an event sequence order stated in the intermediate file(s), and if the stress mode is specified then the replay client releases request events to a database server in an attempted emulation of a timing stated in the intermediate file(s) without necessarily maintaining submission order with regard to events released from other clients.

In some embodiments, wherein the synchronization mode is specified, the process further includes at least two replay clients synchronizing 348 with each other to provide order synchronization during the replay. In some, the process further includes at least two replay clients each generating 350 a respective result file, and a replay controller aggregating 352 the replay client result files.

In some embodiments, the replay client releases 344 request events to a first database server (i.e., a first configuration) during a first replay in the specified mode 206, and the process further includes the replay client releasing 344 the same request events to a second database server (i.e., an altered 336 configuration) during a second replay in the specified mode.

Configured Media

Some embodiments include a configured computer-readable storage medium 112. Medium 112 may include disks (magnetic, optical, or otherwise), RAM, EEPROMS or other ROMs, and/or other configurable memory, as opposed to propagated signals. The storage medium which is configured may be in particular a removable storage medium 114 such as a CD, DVD, or flash memory. A general-purpose memory, which may be removable or not, and may be volatile or not, can be configured into an embodiment using items such as replay modes 206 and other replay parameters 204, intermediate files 226, and modules 222, 230, in the form of data 118 and instructions 116, read from a removable medium 114 and/or another source such as a network connection, to form a configured medium. The configured medium 112 is capable of causing a computer system to perform process steps for transforming data through scalable mode-dependent database replay as disclosed herein. FIGS. 1 through 6 thus help illustrate configured storage media embodiments and process embodiments, as well as system and process embodiments. In particular, any of the process steps illustrated in FIG. 3, FIG. 4, and/or FIG. 6, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

The following discussion is derived from prototype documentation. Distributed Replay tool (a.k.a. DReplay) is a prototype program implemented by Microsoft® Corporation. Aspects of the DReplay program and/or documentation are consistent with or otherwise illustrate aspects of the embodiments described herein. However, it will be understood that DReplay documentation and/or implementation choices do not necessarily constrain the scope of such embodiments, and likewise that DReplay and/or its documentation may well contain features that lie outside the scope of such embodiments. It will also be understood that the discussion below is provided in part as an aid to readers who are not necessarily of ordinary skill in the art, and thus may contain and/or omit details whose recitation below is not strictly required to support the present disclosure.

As context for upgrade compatibility testing using replay, assume that a DBA wants to know the impact on application behavior of upgrading a production database server to the next major version (or CTP/service pack). The DBA can use familiar tools such as the Microsoft® Upgrade Advisor tool to perform static analysis and dynamic analysis of a server 130, and to capture a trace file 124, in the production environment. In a test environment, the DBA can use DReplay with the current configuration and with the contemplated upgrade configuration, and generate analysis files 238 and other reports.

Unlike some familiar approaches, using an enhanced replay tool such as DReplay is not necessarily resource bottle-necked on single replay client, thereby strongly limiting the amount of concurrency and throughput achievable on a server 130. The Distributed Replay tool (DReplay) provides multi-client scalability and higher workload replay fidelity, with capability to stress test using a production-level workload.

FIG. 4, which was discussed earlier, illustrates workflow for DReplay. FIG. 5, also discussed earlier, illustrates some time intervals which are scalable in a DReplay replay, namely, Connect-Time (delta time between trace start and login) and Think-Time (delta time between two events on the same client-server connection).

The following table illustrates aspects of replay modes 206 available through DReplay sequence control:

|  | Synchronization Mode | Stress Mode |
|---|---|---|
| Submit order: | Event submit ordering across connections | Event submit ordering within connections |
| Submit timing: | Submit time synchronization | Connect-time (0%-100%) Think-time (0%-100%) |
| When to use: | High-fidelity replay mode, such as functional runs | High-throughput replay mode, such as performance and stress |

An additional option, to cap 328 idle time to X seconds, can be combined with either sync mode 210 or stress mode 212.

Other DReplay features include Healthmon for deadlock detection, a configurable query timeout, and result trace collection (execution success/failure, execution elapsed time in microseconds, on/off control of the number of rows in result sets, on/off control of result set contents. A variety of Microsoft® SQL Server® database server versions were supported, in terms of trace file version and target server 130 version.

In terms of measuring fidelity, DBAs may use an analytic framework such as one outlined by the following; throughput (requests per second) scales with DReplay as the number of replay clients increases:

```
Replay Fidelity
    Load Consistency
        Throughput Fidelity
        CPU-Effective Throughput Fidelity
        IO-Effective Throughput Fidelity
    Result Consistency
        Error Deviation
        Data Deviation
```

In terms of DReplay setup, DBAs may use a configuration file, such as a *.msi file, make reference to generally familiar details in Microsoft's Books On Line service, and then set up 310 a replay environment along the lines discussed herein.

In terms of launching 302 preprocessing, a DReplay implementation provided command-line options consistent with the following:
dreplay preprocess [-m controller] -i input_trace_file -d controller_working_dir [-c config_file] [-f status_interval]
[e.g.,] dreplay preprocess -m localhost -i c:\mytrace.trc -d c:\WorkingDir -c c:\DReplay.exe.preprocess.config -f 5

An example DReplay.Exe.Preprocess schema file included disclaimers and notices which read as follows:

Microsoft does not make any representation or warranty regarding the schema or any product or item developed based on the schema. The schema is provided to you on an AS IS basis. Microsoft disclaims all express, implied and statutory warranties, including but not limited to the implied warranties of merchantability, fitness for a particular purpose, and freedom from infringement. Without limiting the generality of the foregoing, Microsoft does not make any warranty of any kind that any item developed based on the schema, or any portion of the schema, will not infringe any copyright, patent, trade secret, or other intellectual property right of any person or entity in any country. It is your responsibility to seek licenses for such intellectual property rights where appropriate. MICROSOFT SHALL NOT BE LIABLE FOR ANY DAMAGES OF ANY KIND ARISING OUT OF OR IN CONNECTION WITH THE USE OF THE SCHEMA, INCLUDING WITHOUT LIMITATION, ANY DIRECT, INDIRECT, INCIDENTAL, CONSEQUENTIAL (INCLUDING ANY LOST PROFITS), PUNITIVE OR SPECIAL DAMAGES, WHETHER OR NOT MICROSOFT HAS BEEN ADVISED OF SUCH DAMAGES.

The rest of the example DReplay.Exe.Preprocess file read substantially as follows:

```
<?xml version="1.0" encoding="utf-8" ?>
<xsd:schema xmlns:xsd="http://www.w3.org/2001/XMLSchema"
attributeFormDefault="unqualified" elementFormDefault="qualified" >
<xsd:annotation>
    <xsd:documentation>
```

The following schema for Microsoft SQL Server Distributed Replay describes preprocess configuration file in XML format.

(c) Microsoft Corporation. All rights reserved.

```
    </xsd:documentation>
</xsd:annotation>
<xsd:annotation>
    <xsd:appinfo>DReplay Preprocess Config XML
    Schema</xsd:appinfo>
    <xsd:documentation>
        XML Schema for DReplay Preprocess Configuration File
    </xsd:documentation>
</xsd:annotation>
    <xsd:element name="Options">
        <xsd:complexType>
            <xsd:sequence>
                <xsd:element name="PreprocessModifiers">
                    <xsd:complexType>
                        <xsd:sequence>
                            <xsd:element
                                name="IncSystemSession"
                                type="xsd:string"
minOccurs="0" maxOccurs="1" />
                            <xsd:element name="MaxIdleTime"
                                type="xsd:integer" minOccurs="0"
maxOccurs="1" default="-1"/>
                        </xsd:sequence>
                    </xsd:complexType>
                </xsd:element>
            </xsd:sequence>
        </xsd:complexType>
    </xsd:element>
</xsd:schema>
```

For instance, a particular DReplay.Exe.Preprocess file read in part:

```
<?xml version='1.0'?>
<Options>
    <PreprocessModifiers>
        <IncSystemSession>No</IncSystemSession>
        <MaxIdleTime>-1</MaxIdleTime>
    </PreprocessModifiers>
</Options>
```

In terms of initiating 334 database replay, a DReplay implementation provided command-line options consistent with the following:
dreplay replay [-m controller] -d controller_working_dir [-o] [-s target_server] -w clients [-c config_file] [-f status_interval]

[e.g.] dreplay replay -m controller1-d c:\WorkingDir -o -s sqltest1-w client1,client2,client3,client4-c c:\DReplay.exe.replay.config -f 5

An example DReplay.Exe.Replay schema file included disclaimers and notices which read like those described above for the DReplay.Exe.Preprocess schema file. The rest of the example DReplay.Exe.Replay file read substantially as follows:

```
<?xml version="1.0" encoding="utf-8"?>
<xsd:schema xmlns:xsd="http://www.w3.org/2001/XMLSchema"
attributeFormDefault="unqualified" elementFormDefault="qualified" >
<xsd:annotation>
    <xsd:documentation>
```

This schema for Microsoft SQL Server Distributed Replay describes replay configuration file in XML. (c) Microsoft Corporation. All rights reserved.

```
    </xsd:documentation>
</xsd:annotation>
<xsd:annotation>
    <xsd:appinfo>DReplay Replay Config XML Schema</xsd:appinfo>
    <xsd:documentation>
        XML Schema for DReplay Replay Configuration File
    </xsd:documentation>
</xsd:annotation>
    <xsd:element name="Options">
        <xsd:complexType>
            <xsd:sequence>
                <xsd:element name="ReplayOptions">
                    <xsd:complexType>
                        <xsd:sequence>
                            <xsd:element name="Server" type="xsd:string" minOccurs="1" maxOccurs="1" />
                            <xsd:element name="SequencingMode" type="xsd:string" minOccurs="1" maxOccurs="1" />
                            <xsd:element name="ConnectTimeScale" type="xsd:integer" minOccurs="0" maxOccurs="1" default="100"/>
                            <xsd:element name="ThinkTimeScale" type="xsd:integer" minOccurs="0" maxOccurs="1" default="100"/>
                            <xsd:element name="HealthmonInterval" type="xsd:integer" minOccurs="0" maxOccurs="1" default="60"/>
                            <xsd:element name="QueryTimeout" type="xsd:integer" minOccurs="0" maxOccurs="1" default="3600"/>
                            <xsd:element name="DataProviderType" type="xsd:string" minOccurs="0" maxOccurs="1"/>
                            <xsd:element name="ThreadsPerClient" type="xsd:integer" minOccurs="0" maxOccurs="1" default="255"/>
                        </xsd:sequence>
                    </xsd:complexType>
                </xsd:element>
                <xsd:element name="OutputOptions">
                    <xsd:complexType>
                        <xsd:sequence>
                            <xsd:element name="ResultTrace">
                                <xsd:complexType>
                                    <xsd:sequence>
                                        <xsd:element name="RecordRowCount" type="xsd:string" minOccurs="0" maxOccurs="1" />
                                        <xsd:element name="RecordResultSet" type="xsd:string" minOccurs="0" maxOccurs="1" />
                                    </xsd:sequence>
                                </xsd:complexType>
                            </xsd:element>
                        </xsd:sequence>
                    </xsd:complexType>
                </xsd:element>
            </xsd:sequence>
        </xsd:complexType>
    </xsd:element>
</xsd:schema>
```

For instance, a particular DReplay.Exe.Replay file for synchronization mode replay read in part:

```
<?xml version='1.0'?>
<Options>
    <ReplayOptions>
        <Server>server_name\replay_target_instance</Server>
        <SequencingMode>synchronization</SequencingMode>
        <ConnectTimeScale></ConnectTimeScale>
        <ThinkTimeScale></ThinkTimeScale>
        <HealthmonInterval>60</HealthmonInterval>
        <QueryTimeout>3600</QueryTimeout>
        <ThreadsPerClient>256</ThreadsPerClient>
    </ReplayOptions>
    <OutputOptions>
        <ResultTrace>
            <RecordRowCount>Yes</RecordRowCount>
            <RecordResultSet>No</RecordResultSet>
        </ResultTrace>
```

A particular DReplay.Exe.Replay file for stress mode replay read in part:

```
<?xml version='1.0'?>
<Options>
    <ReplayOptions>
        <Server>server_name\replay_target_instance_name</Server>
        <SequencingMode>stress</SequencingMode>
        <ConnectTimeScale>100</ConnectTimeScale>
        <ThinkTimeScale>100</ThinkTimeScale>
        <HealthmonInterval>60</HealthmonInterval>
        <QueryTimeout>3600</QueryTimeout>
        <ThreadsPerClient>256</ThreadsPerClient>
    </ReplayOptions>
    <OutputOptions>
        <ResultTrace>
            <RecordRowCount>Yes</RecordRowCount>
            <RecordResultSet>No</RecordResultSet>
        </ResultTrace>
    </OutputOptions>
</Options>
```

In some cases, a DReplay implementation included three major software components, namely, an administration tool 202, a replay controller (module 222), and a replay client (module 230). In some cases, there is only one controller 404 instance in each replay environment. The administration tool 202 directly interacts with the controller, which in turn commands the set of replay clients 406 to perform the appropriate actions. There can be one or more replay client instances, which are hosted on a set of client nodes (a client node includes a client operating system running on a physical machine or inside a virtual machine).

Before the actual replay, a preprocessing is performed, on the replay controller. During the preprocessing 302 stage, the original captured trace(s) is converted into one or more intermediate files 226, along with an XML statistics file 236. Only when a trace file has been preprocessed can the user initiate 334 replay.

Preprocessing may provide advantages. It may be more efficient to sort the events once before replay time rather than repeatedly during replay time. Event Sequence represents the actual order in which SQL Server® code generated the event, which does not necessarily match the order in which events are recorded into the trace file. Event Sequence is used for event sequence control rather than relying on the physical order. (The Event Sequence column was newly added in Microsoft's SQL Server® 2005 release.) An intermediate file 226 can be made more compact by retaining only a subset set of the data in the captured trace. Event classes and event columns that are not used for replay will be removed from the intermediate file(s). This reduces the file size and makes it cheaper to transmit the file(s) to each replay client and later on for each replay client to read from during replay. Intermediate file(s) can also contain pre-calculated data, reducing the amount of processing needs at replay time. Having an intermediate file format can also make it easier to support different file formats in the future (e.g. an XEvent trace file). Intermediate representation file format is not limited to captured trace file format.

After the preprocess stage, the set of intermediate files are then dispatched 304 across the set of replay clients the user has chosen. An intermediate file may be chunked and distributed as shredded (not replicated) across clients. The intermediate files can still be quite large, and network copy can take a few seconds to a few minutes depending on the network bandwidth, network condition, and file size. It may be undesirable to do this step at the beginning of replay because the user expects the replay to start immediately. The file distribution among clients can be done in an optimistic "load-balanced" manner, using information gathered during the pre-process stage.

The replay stage takes place after dispatch and only operates on the intermediate representation (IR) files 226 dispatched to the clients. In some embodiments, replay event release does not retrieve information from the original trace input (trace file(s) or trace table). Release code may contain a simplified version of the Microsoft® SQL Profiler replay logic, since one has done preliminary processing on the trace input.

In the replay stage, multiple clients are submitting events to the target DB server 130. Two event-sequencing modes will be made available for event scheduling: Synchronization Mode and Stress Mode.

In some embodiments, synchronization mode will be the recommended mode for conducting application compatibility testing. There are two constraints to satisfy in synchronization mode. Under order synchronization, events should be released in the order they were submitted during capture time; order and timing of when the Remote Procedure Call (RPC) or language event completed is not considered. The submit order is maintained both within and across connections. Since different connections could be replayed by different clients, this means clients may need to synchronize with each other to achieve order synchronization. Under time synchronization, the replay engine will try to emulate the original event submission time, such that, replay can reproduce the query rate observed during the capture to the extent possible. The submission time could be emulated at microsecond granularity.

Compared to synchronization mode, in some embodiments stress mode does not meet either order or time sync constraint. Indeed, submit order is maintained only within each connection, because by definition each connection will only have one event outstanding at any given moment in time. Clients 406 operate independently of each other. Without the need to synchronize across clients, the replay engine can scale. A client does not necessarily wait for an event to commit before sending the next event.

In some embodiments, when submitting requests to a database, each replay client first creates a connection to the database and then submits requests via the connection. Requests in a single connection have the logical order used in the original captured trace. This order will be maintained by both synchronization mode and stress mode. In addition, synchronization mode releases requests using the event's original timestamp and in a manner that maintains the submission order across connections. In stress mode, the cross-connection-submission-order is not maintained while releasing requests; the stress mode only guarantees event order within a single connection and the think time between two events. The think time can be adjusted according to the think time scaling option.

Conclusion

Although particular embodiments are expressly illustrated and described herein as processes, as configured media, or as systems, it will be appreciated that discussion of one type of embodiment also generally extends to other embodiment types. For instance, the descriptions of processes in connection with FIGS. 3, 4, and 6 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A process suitable for use by a database administrator to help assess the potential impact of database server changes on database application behavior, the process comprising the steps of:
    launching a database activity trace preprocessing phase which converts captured database activity trace file(s) into intermediate file(s) in which database events are sorted according to their order of generation, which does not necessarily match the order in which the database events were captured in the intermediate file(s);
    dispatching the intermediate file(s) across a set of one or more replay clients;
    selecting between at least a synchronization mode and a stress mode, the synchronization mode configured to release all events during replay in the order in which events were submitted to a database server, the stress mode configured to release a given client's events during replay in emulation of the timing in which events were submitted to the database server, the stress mode subject to a connect-time scaling factor which indicates the replay will not adhere to strict event timing with respect to connection login events, the stress mode also subject to a server idle time cap which causes requests to be released to the server faster than a release timing that is specified in the captured database activity trace file(s); and
    initiating a database activity replay using the intermediate file(s), the replay client(s), and the selected mode, the database activity replay of request events being based on at least the connect-time scaling factor, which scales the time between a trace start and a connection login during the replay, and the server idle time cap, which sets a cap (a maximum) on server idle time for the replay.

2. The process of claim 1, wherein the initiating step initiates a first server database activity replay using the intermediate file(s), the replay client(s), the selected mode, and a first database server configuration, and the process further comprises:
    initiating a second database activity replay using the intermediate file(s), the replay client(s), the selected mode, and a second database server configuration; and
    comparing a result of the first server database activity replay with a result of the second server database activity replay.

3. The process of claim 1, further comprising at least one of the following:
    merging multiple traced events into a single replay command in the intermediate file; and indicating a query timeout value for the replay.

4. The process of claim 1, further comprising setting up the replay by doing at least one of the following:
    specifying a service account;
    configuring a filesystem permission;
    provisioning a component access;
    creating a firewall rule.

5. The process of claim 1, wherein the dispatching step dispatches the intermediate file(s) by shredding the intermediate file(s) in a load-balanced manner across a set of at least three replay clients.

6. The process of claim 1, further comprising setting a think-time scaling factor, for scaling the time between events on a replay client—database server connection during a replay.

7. A computer-readable storage medium (as opposed to a propagated signal) configured with data and with instructions that when executed by at least one processor causes the processor(s) to perform a process for simulating database application behavior, the process comprising the steps of:
    a replay client communicating with a process which launched a database activity trace preprocessing phase which converts captured database activity trace file(s) into intermediate file(s), the process also having dispatched the intermediate file(s) across a set of one or more replay clients, the process also having selected between at least a synchronization mode and a stress mode, the synchronization mode configured to release all events during replay in the order in which events were submitted to a database server, the stress mode configured to release a given client's events during replay in emulation of the timing in which events were submitted to the database server, the process also having initiated a database activity replay using the intermediate file(s), the replay client(s), and the selected mode;

the replay client obtaining a portion of intermediate file(s) in which captured database events are sorted according to their order of generation, which does not necessarily match the order in which the database events were captured in the intermediate file(s);

the replay client receiving a replay mode instruction which specifies a replay client synchronization mode or a replay client stress mode, the replay client stress mode subject to a replay client connect-time scaling factor which indicates the replay will not adhere to strict event timing with respect to connection login events, the replay client stress mode also subject to a replay client server idle time cap which causes requests to be released to the server faster than a release timing that is specified in captured database activity trace file(s); and the replay client releasing request events to a database server during a replay in response to the specified mode, the replay of request events also being based on at least the connect-time scaling factor, which scales the time between a trace start and a connection login during the replay, and the server idle time cap, which sets a cap (a maximum) on server idle time for the replay.

8. The configured medium of claim 7, wherein the synchronization mode is specified, and the process further comprises at least two replay clients synchronizing with each other to provide order synchronization during the replay.

9. The configured medium of claim 7, wherein the process further comprises at least two replay clients each generating a respective result file, and a replay controller aggregating the replay client result files.

10. The configured medium of claim 7, wherein the replay client releases request events to a first database server during a first replay in the specified mode, and the process further comprises the replay client releasing the same request events to a second database server during a second replay in the specified mode.

11. The configured medium of claim 7, wherein the replay client releases request events based partially on a think-time scaling factor which scales the time between events on a replay client—database server connection during a replay.

12. A distributed database activity replay computer system comprising:

instructions which cause at least one processor to perform a process to help assess the potential impact of database server changes on database application behavior, the process comprising the steps of: launching a database activity trace preprocessing phase which converts captured database activity trace file(s) into intermediate file(s) in which database events are sorted according to their order of generation, which does not necessarily match the order in which the database events were captured in the intermediate file(s); dispatching the intermediate file(s) across a set of one or more replay clients; selecting between at least a synchronization mode and a stress mode, the synchronization mode configured to release all events during replay in the order in which events were submitted to a database server, the stress mode configured to release a given client's events during replay in emulation of the timing in which events were submitted to the database server; and initiating a database activity replay using the intermediate file(s), the replay client(s), and the selected mode;

a replay controller and at least two replay clients, the replay controller and each replay client having a respective logical processor and a respective memory in operable communication with the respective logical processor, the replay controller in operable communication with the replay clients;

a replay mode instruction, residing in at least the replay controller memory, which is selected from and specifies at least one of: the synchronization mode in which event replay is synchronized across the replay clients, the stress mode in which event replay is not synchronized across the replay clients, the stress mode subject to the connect-time scaling factor which indicates the replay will not adhere to strict event timing with respect to connection login events, the stress mode also subject to the server idle time cap which causes requests to be released to the server faster than a release timing that is specified in captured database activity trace file(s); and client replay modules residing in the respective replay client memories, each replay module configured with data and with instructions that when executed by at least one processor causes the processor(s) to perform a process in which the replay client releases request events to a database server during a replay as indicated by the specified mode;

wherein the system is further characterized in that the system processes request events based on at least the connect-time scaling factor, which scales the time between a trace start and a connection login during the replay, and the server idle time cap, which sets a cap (a maximum) on server idle time for the replay.

13. The system of claim 12, in combination with a SQL database server which is in operable communication with the replay clients to receive request events and to send corresponding responses to the replay clients.

14. The system of claim 12, in combination with a replay administration tool which is in operable communication with the replay controller to identify a replay events file to the replay controller.

15. The system of claim 12, in combination with a preprocessing module configured with data and with instructions that when executed by at least one processor causes the processor(s) to perform a process in which database events of a captured database activity trace file are sorted according to their order of generation.

16. The system of claim 12, in combination with a preprocessing module configured with data and with instructions that when executed by at least one processor causes the processor(s) to perform a process in which any unused event classes and any unused event columns of a captured database activity trace file are excluded from inclusion in an intermediate file.

17. The system of claim 12, wherein the replay mode instruction specifies the synchronization mode, and wherein the client replay modules are configured to release request events while satisfying (a) an order synchronization constraint under which event submission order is maintained both within and across connections between a database server and the replay clients, and (b) a time synchronization constraint under which the replay clients attempt to emulate request event submission time.

18. The system of claim 12, wherein the client replay modules are also configured to allow scaling of a plurality of think-times between events on a connection.

19. The system of claim 12, in combination with an intermediate file containing a sequence of database events from captured database activity trace file(s), in which the database events are sorted according to their order of generation, and the intermediate file contains pre-calculated data to reduce processing during a replay.

20. The system combination of claim 19, in combination with (a) a first replay result file from a first replay performed with the replay controller, the replay clients, the intermediate file, and a first SQL database server, and (b) a second replay result file from a second replay performed with the replay controller, the replay clients, the intermediate file, and a second SQL database server.

* * * * *